Patented Aug. 31, 1943

2,328,103

UNITED STATES PATENT OFFICE 2,328,103

CATALYTIC CONVERSION OF PETROLEUM HYDROCARBONS

Melvin J. See and James C. Baillie, Chicago, Ill., assignors to Standard Oil Company, Chicago, Ill., a corporation of Indiana No Drawing. Application December 18, 1939, Serial No. 309,920

2 Claims. (Cl. 196—52)

This invention relates to the conversion of hydrocarbon oils and particularly to the conversion of heavy hydrocarbon oils such as gas oils, petroleum residuums, hydrocarbon waxes, etc. into lower boiling hydrocarbons, particularly gasoline. The invention relates more particularly to the conversion of heavy hydrocarbon oils by contacting their vapors with catalysts at high temperatures. One of the objects of the invention is to provide a catalyst which will convert a larger amount of the oil into gasoline before it becomes necessary to regenerate it. Another object of the invention is to provide a catalyst which may be repeatedly regenerated by treatment with an oxygen containing gas for removal of carbonaceous matter without significant loss of catalyst activity. Still another object of the invention is to provide a catalyst of great physical strength which may be employed in granular form without serious disintegration. Another object of the invention is to provide a catalyst of low carbon forming tendency. Other objects will become apparent from the following description.

The catalyst which we employ is prepared in the following manner: A silica gel, so-called, is prepared by adding a solution of soluble silicate, for example, sodium silicate, to an excess of strong mineral acid, such as hydrochloric acid or sulfuric acid. We prefer to use sodium silicate solution containing about 15% to 20% of $Na_2(SiO_3)_x$. In this formula "$x$" is unity or greater. The acid employed in making the gel may suitably be about 15% to 25% $H_2SO_4$ and an excess of 10% to 50% may suitably be employed. Other strong acids may be used, such as HCl, $HNO_3$, etc. We have sometimes reversed this procedure, however, and added the acid to the silicate solution which causes immediate precipitation. This method gives a very active catalyst but one of low mechanical strength.

After adding the silicate solution to the acid, and mixing, it is allowed to stand until the solution solidifies to a jelly, which may take a few hours to a day or more. The jelly is broken up by agitation and washed in running water until substantially all the acid and soluble salts are removed. Considerable time is required to permit all the salts to diffuse from the pieces of jelly and the washing operation is facilitated by employing hot water or by digestion and boiling. The gel is then separated from the water and dried. It now resembles an irregular sand and at this stage it is crushed and screened to remove particles which are too fine for ultimate use. The gel so prepared is characterized by possessing a submicroscopic pore structure which provides an enormous amount of "pore surface" accessible only to those materials which can freely penetrate the pores and gain access to the interior of the grains. If desired, the gel may be washed only partially at first, then partly dried and finally washed until the water gives no further test for acid ion. Also, the gel may be further washed with distilled water after final drying.

The next step in the preparation of our improved catalyst is to subject the gel to the action of a soluble salt of vanadium under conditions such that a layer of insoluble vanadium compound is deposited on the interior pore surface of the gel. Heretofore, attempts have been made to deposit metal compounds on silica gel but these attempts have usually not succeeded in accomplishing more than depositing the metal compound on the external surface of the silica gel grains. Because of the extremely small dimensions of the pores, these are apparently plugged by precipitates and great care must be exercised to prevent the formation of a heavy precipitate. This we avoid by maintaining the gel in a slightly acid condition and the presence of basic precipitating reagents is scrupulously avoided.

According to our process, we immerse the gel in a solution of a vanadium salt, for example, a 0.1 to 0.5 molar solution of vanadium nitrate. In one operation 84.42 grams of vanadium sulfate were dissolved in 5 liters of water, making a 0.2 M. solution. The solution was heated to 185° F. and to it were added 1300 ml. of dry silica gel. The gel was digested in the solution for 2 hours and the solution was then decanted and the gel washed 6 times by decantation in 750 ml. of water per wash. The resulting catalyst was dried at about 250° F. for 36 hours.

During the digestion of the gel in a vanadium sulfate solution, we have observed a hydrolysis of the vanadium salt, apparently induced by the adsorptive action of the silica gel for vanadium oxide or other vanadium compounds. As the digestion proceeds, the hydrolysis may be observed by determining the hydrogen ion concentration of the solution which indicates the formation of an acid, in this case, sulfuric acid. The following data show the effect of the hydrolysis:

| | pH |
|---|---|
| Solution at start | 2.02 |
| ½ hr. digest. with gel | 1.97 |
| 1 hr. digest. with gel | 1.97 |
| 1½ hrs. digest. with gel | 1.95 |
| 2 hrs. digest. with gel | 1.93 |

Although the solution in this case was 0.2 molar, stronger solutions may be used. For example, vanadium salt concentrations up to 10 molar may be employed. The catalyst above prepared was analyzed and was found to contain 0.12% of vanadium.

When activating the gel with vanadium salt, we prefer to maintain the solution slightly acid, corresponding to a hydrogen ion concentration of about 1-4 pH. The hydrogen ion concentration will usually increase during the activation treatment, for example, the pH may be 2.5 at the start and 1 to 1.5 at the end of the treatment.

We prefer to employ this catalyst for the cracking of hydrocarbon oils at temperatures of about 700 to 1100° F., employing contact times of between about ½ second to 5 minutes, preferably contact times with the range of 1 second to 1 minute. Contact time referred to is the time required for one volume of oil vapor at the condition of experiment to pass one volume of catalyst. Time of contact may also be expressed by the "space velocity" which is the volume of oil treated by one volume of catalyst in one hour. Space velocity of 0.2 to 10 may be used. We prefer to employ our new catalyst at relatively low pressures, for example atmospheric to 50 lbs. per square inch gage. However, somewhat higher pressures, e. g., 100 to 200 lbs. per square inch may be used.

As an example of the results obtained with our vanadium catalyst, midcontinent gas oil was vaporized and heated to a high temperature and the vapors conducted through a bed of the granulated catalyst at a temperature of 925° F. The space velocity was 1.01 volumes of oil per volume of catalyst per hour. Two runs were made, one with the catalyst freshly prepared and another with catalyst which was previously used and then regenerated by combustion with air. The following results were obtained:

| | Fresh catalyst | Regenerated catalyst |
|---|---|---|
| Gasoline vol. per cent | 16.6 | 17.2 |
| Gas wt. per cent | 3.43 | 3.78 |
| Lbs. of gas/gal. gasoline | 1.46 | 1.55 |
| Distillation: | | |
| End point ° F | 394 | 400 |
| Per cent off at 158° F | 24.5 | 22.5 |
| Reid vapor pressure | 10.5 | 9.1 |
| Knock rating of gasoline, A. S. T. M | 80.1 | 77.7 |
| Carbon formation (on catalyst) | 0.13 | 0.15 |

The explanation of the effectiveness of our new catalyst is not easily determined. We believe, however, that when the silica gel is treated with the vanadium salt solution, there occurs a simultaneous adsorption and hydrolysis causing the deposition of a vanadium compound on the surface of the silica throughout its entire pore structure. This compound is probably an oxygen compound of vanadium such as vanadium hydroxide or more probably the vanadium unites to form a complex compound with the $SiO_2$ molecules and hydrated $SiO_2$ molecules on the surface of the gel and within the pores of the grains thereof. It is believed that the molecules of $SiO_2$ at the surface present unsatisfied valences which form a chemical union with the vanadium and its compounds so that the gel treated with vanadium salt solution is substantially identical in physical structure with the untreated silica gel excepting that the entire surface, including the immense interior pore surface, calculated to be 50,000 square feet per cubic inch, is coated with not more than a monomolecular layer of vanadium compound. Furthermore, we believe that the electronic structure of the vanadium compound on the surface is disturbed by the unbalanced electronic structure of the $SiO_2$, previously referred to as unsatisfied valence, and that in some way the peculiarly high activity of these catalysts is related to their unbalanced electronic structure, or to the molecular orientation of the vanadium compound.

As hereinabove pointed out, there appears to be a definite reaction between the silica gel and the vanadium salt used in our process of activation. Adsorption of a basic vanadium compound on the extensive surface of the silica gel appears to release the acid in the solution and this reaction may be called an "adsorbolytic reaction," indicating that the hydrolysis of the salt is brought about by the adsorption phenomenon. Simultaneously, with the formation of acid in the solution, there is deposited within the silica a measurable amount of vanadium compound which we have shown by analysis to vary between about 0.05 to 2% of vanadium, depending partly on the concentration of vanadium salt solution employed, the hydrogen ion concentration in the solution, and the method of treatment.

We may increase the amount of vanadium hydrolyzed by various methods. For example, we may add a buffer salt to the solution, such as vanadium acetate for the purpose of regulating the pH value of the solution, care being taken to avoid pH values above 4 which might result in the precipitation of insoluble vanadium compounds by double decomposition. We may also repeat the treatment of the gel with vanadium solution of the same or different concentrations, or we may perform the treatment in a flowing stream. The vanadium salt solution may be made to flow through a series of beds of the gel in countercurrent rotation so that the most nearly spent solution serves to contact the fresh gel, thus adsorbing the greater amount of the vanadium from the solution.

In the previous description of our method of preparing our new catalyst, the freshly prepared gel was dried after washing and before treating with the vanadium solution. However, it is sometimes desirable to omit this drying step. The freshly made gel which has been thoroughly washed may be immediately treated with the vanadium solution and then dried. In this case, however, a longer time is required for diffusion of the solution into the larger pieces of the jelly or precipitate.

As indicated above, the catalyst may be regenerated after it has become fouled with carbonaceous deposits in the cracking operation. Regeneration is most conveniently accomplished by passing a stream of air and inert gas, for example, steam or flue gas, through the catalyst bed, care being taken to control the oxygen concentration of the regenerating gas so that the combustion temperature is kept below about 1200° F. and preferably below about 1100° F. Excessive heating above these temperatures may cause catalyst deterioration. After regeneration, the cracking may be continued. The duration of cracking between regeneration periods may be about 5 hours but this depends largely on the nature of the stock being cracked. If the stock cracked is a residual oil containing asphaltic matter, the duration of cracking is considerably less before catalyst activity is seriously reduced. Thus, with a typical midcontinent residual oil of about 22° A. P. I. gravity, the catalyst may be used for a period of about 30 minutes to 2 hours between regenerations. When using gas oil, for example, a gas oil boiling from 450 to 800° F., we have found that in a typical operation the catalyst activity has decreased about 25% to 50% in a period of 6 hours. In the case of residual oils or very heavy distillate charging stocks, we may initially crack the oil in one catalyst bed and produce intermediate boiling hydrocarbons with very little gasoline. Then we may pass the vapors directly into a second catalyst bed with or without heating to a higher temperature to complete the cracking. The extent or depth of cracking per pass depends partly on the freshness of the catalyst and on the temperature. If desired, the process may be conducted to produce from gas oil about 45% to 55% of gasoline in a single pass and the uncracked products heavier than gasoline may be either recycled in the operation or cracked in a secondary cracking operation. Alternatively, the extent of cracking may be maintained at about 20 to 30% and the uncracked heavy products may be recycled until completely cracked, the only products being gasoline and gas. Carbonaceous matter produced in the operation is deposited on the catalyst and is removed in regeneration.

If desired, we may employ our catalyst in a moving bed apparatus in which a portion of the spent catalyst is continuously withdrawn and regenerated externally, fresh and/or regenerated catalyst being supplied continuously to the apparatus. We may also employ our catalyst in finely divided form. For example, the catalyst may be finely divided by grinding and supplied as a slurry in oil to the cracking chamber or coil or introduced as a powder into the vapor stream. In this type of operation, the spent catalyst is settled or filtered from the products and separately regenerated.

Although we have given specific examples of methods of preparing our new catalyst and have described its use in certain cracking operations, we intend that our invention be limited only by the following claims.

We claim:

1. The process of converting heavy hydrocarbon oils into gasoline comprising subjecting the vapors from said oils at a conversion temperature of about 700 to 1100° F. to the action of a solid conversion catalyst prepared by immersing silica gel in an acid solution of a soluble salt of vanadium, maintaining said silica gel in contact with said solution until a definite increase in the hydrogen ion concentration results from the adsorbolytic reaction between said gel and said vanadium salt while avoiding the precipitation of vanadium in insoluble form, thereafter separating said gel from said solution and drying it to produce the desired catalyst.

2. The process of cracking heavy hydrocarbon oils for the production of high knock rating gasoline which comprises subjecting the vapors of said oils at a conversion temperature within the range of about 700 to 1100° F. to the action of a solid conversion catalyst consisting essentially of silica gel promoted with a small amount of vanadia adsorbed on the surface thereof prepared by digesting said silica in an acid solution of a soluble vanadium salt, avoiding the precipitation of insoluble vanadium compounds from said solution, separating said solution from said silica gel and drying said gel to produce the desired catalyst.

MELVIN J. SEE.
JAMES C. BAILIE.